(12) United States Patent
Bean et al.

(10) Patent No.: US 6,956,612 B2
(45) Date of Patent: Oct. 18, 2005

(54) USER SELECTABLE FOCUS REGIONS IN AN IMAGE CAPTURING DEVICE

(75) Inventors: Heather Noel Bean, Fort Collins, CO (US); Mark Nelson Robins, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 809 days.

(21) Appl. No.: 09/919,521

(22) Filed: Jul. 31, 2001

(65) Prior Publication Data

US 2003/0025821 A1 Feb. 6, 2003

(51) Int. Cl.[7] .............................. G03B 9/08; H04B 5/232
(52) U.S. Cl. ...................... 348/345; 348/349; 348/352; 396/471
(58) Field of Search ................................ 348/349, 348, 348/347, 208.12, 208.14, 229.1, 230.1, 231.6, 348/345, 352, 357, 362, 363, 364; 250/208.1; 396/471

(56) References Cited

U.S. PATENT DOCUMENTS

| | | | | |
|---|---|---|---|---|
| 4,154,505 A | * | 5/1979 | Kato et al. ................... | 359/252 |
| 4,603,356 A | * | 7/1986 | Bates .......................... | 348/367 |
| 4,850,675 A | * | 7/1989 | Hatanaka et al. .............. | 349/2 |
| 5,030,985 A | * | 7/1991 | Bryant ........................ | 396/234 |
| 5,101,276 A | * | 3/1992 | Ohta ........................ | 348/221.1 |
| 5,365,302 A | | 11/1994 | Kodama ...................... | 354/403 |
| 5,379,266 A | * | 1/1995 | Russell ........................ | 365/234 |
| 5,572,343 A | * | 11/1996 | Okamura et al. ............. | 349/74 |
| 5,678,089 A | * | 10/1997 | Bacs et al. ................... | 348/135 |
| 5,781,333 A | * | 7/1998 | Lanzillotta et al. ......... | 359/316 |
| 5,877,809 A | * | 3/1999 | Omata et al. ................ | 348/345 |
| 6,005,990 A | * | 12/1999 | Barrett et al. ............... | 358/483 |
| 6,280,034 B1 | * | 8/2001 | Brennesholtz .............. | 348/742 |
| 6,765,618 B1 | * | 7/2004 | Sato ........................... | 348/348 |
| 2001/0002216 A1 | * | 5/2001 | Chuang et al. ............. | 382/255 |

FOREIGN PATENT DOCUMENTS

| | | | | | |
|---|---|---|---|---|---|
| EP | 926526 A2 | * | 6/1999 | ............ | G02B 7/28 |
| IL | 122133 A | * | 12/2000 | ............ | G03B 3/00 |
| JP | 10108057 A | * | 4/1998 | .......... | H04N 5/232 |
| JP | 10262176 A | * | 9/1998 | .......... | H04N 5/232 |
| JP | 10290389 A | * | 10/1998 | .......... | H04N 5/232 |
| JP | 11261797 A | * | 9/1999 | .......... | H04N 1/387 |
| WO | WO 9211567 A1 | * | 7/1992 | .......... | G03B 15/06 |
| WO | WO 2059692 A1 | * | 8/2002 | .......... | G03B 13/32 |

* cited by examiner

*Primary Examiner*—Aung Moe
*Assistant Examiner*—Jonn M. Villecco

(57) ABSTRACT

An image capturing device includes a focusable lens apparatus, an image sensor comprising a plurality of pixel elements, and an electronically actuatable shutter device including a plurality of individually addressable and actuatable shutter elements. A shutter element substantially corresponds to one or more pixel elements. A processor controls a focus depth of the lens apparatus and selectively actuates particular shutter elements associated with each of a plurality of focus depths during image capture.

27 Claims, 4 Drawing Sheets

USER SELECTABLE FOCUS REGIONS IN AN IMAGE CAPTURING DEVICE

FIELD OF THE INVENTION

The present invention relates generally to an image capturing device, and more particularly to an image capturing device capable of capturing an image at multiple focus depths.

BACKGROUND OF THE INVENTION

Still image capturing devices are used to visually memorialize scenes, events, or items. Still image capturing devices, such as analog and digital cameras, include a lens, a shutter, and some manner of image sensor. In addition, most modern cameras include a processor and/or other control electronics that function to control shutter speed, aperture, flash, focus, etc.

The shutter and the image sensor are the main components of a still image capturing device and operate together in order to produce an image. In operation, the shutter is opened briefly to expose the image sensor to focused light from a lens and thereby form an image. The operation of the shutter is very important, and the quality of the captured image depends on a proper exposure time based on lighting, movement of the subject, focus distance, etc.

A prior art shutter approach used a mechanical shutter. The mechanical shutter has been widely used for a number of years and is generally in the form of an iris-type shutter. However, the prior art mechanical shutter has many drawbacks, including weight, large size, susceptibility to dirt and wear, and the difficulty of precisely controlling shutter exposure times over a wide range of conditions. In addition, the mechanical shutter exposes the entire image as a unit and essentially at once (however, the iris mechanism is open at the center for a longer length of time than at the peripheral region of the iris).

In some prior art cameras, the mechanical shutter is electronically activated by a motor or other electrical actuator. This may produce a more accurate shutter control, but consumes a lot of electrical power, is inflexible, and still exposes the entire image as a unit and for an essentially constant duration.

The prior art therefore cannot control a focus depth of an image in order to capture image portions or objects at different focus depths. For example, in an image of a person in front of a background, prior art image capturing devices focus to the person, and the entire image is captured at that single focus depth. As a result, the background is out of focus. An image captured according to the prior art therefore may have portions that are in focus and may have portions that are out of focus.

Therefore, there remains a need in the art for improvements in still image capturing devices.

SUMMARY OF THE INVENTION

A still image capturing device includes a focusable lens apparatus capable of being focused over a range of focus depths, an image sensor comprising a plurality of pixel elements, and an electronically actuatable shutter device comprising a plurality of individually addressable and actuatable shutter elements. A shutter element substantially corresponds to one or more pixel elements. A processor controls a focus depth of the lens apparatus and selectively actuates particular shutter elements associated with each of a plurality of focus depths during image capture.

DETAILED DESCRIPTION

Figure 1:
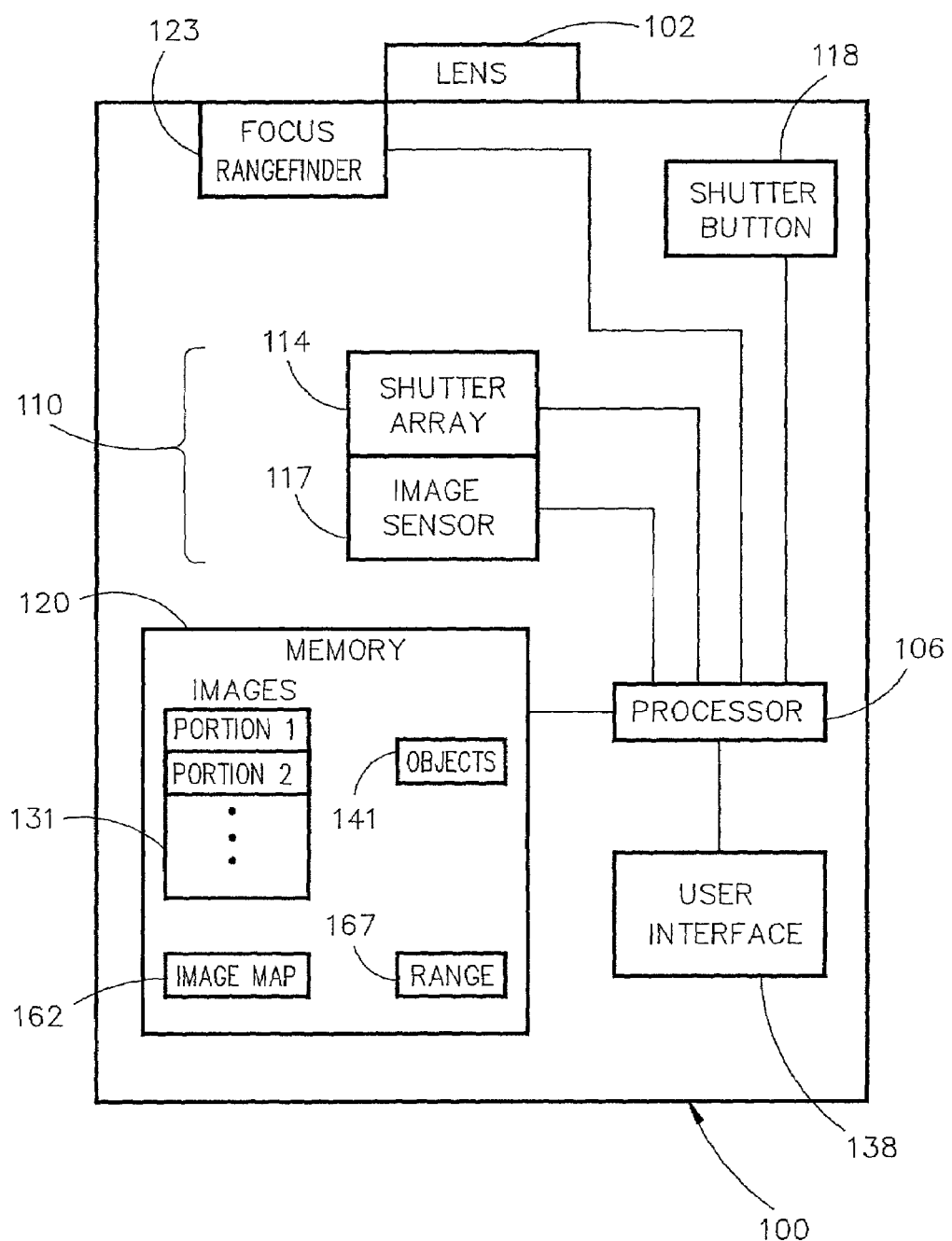
FIG. 1 is a block diagram of a still image capturing device according to one embodiment of the invention.

FIG. 1 is a block diagram of a still image capturing device 100 according to one embodiment of the invention. The image capturing device 100 includes a lens apparatus 102, a processor 106, a shutter array 114, an image sensor 117, a shutter button 118, and a memory 120. The shutter array 114 and the image sensor 117 may be provided as an imaging module 110. In addition, the image capturing device 100 includes a user interface 138.

Figure 2:
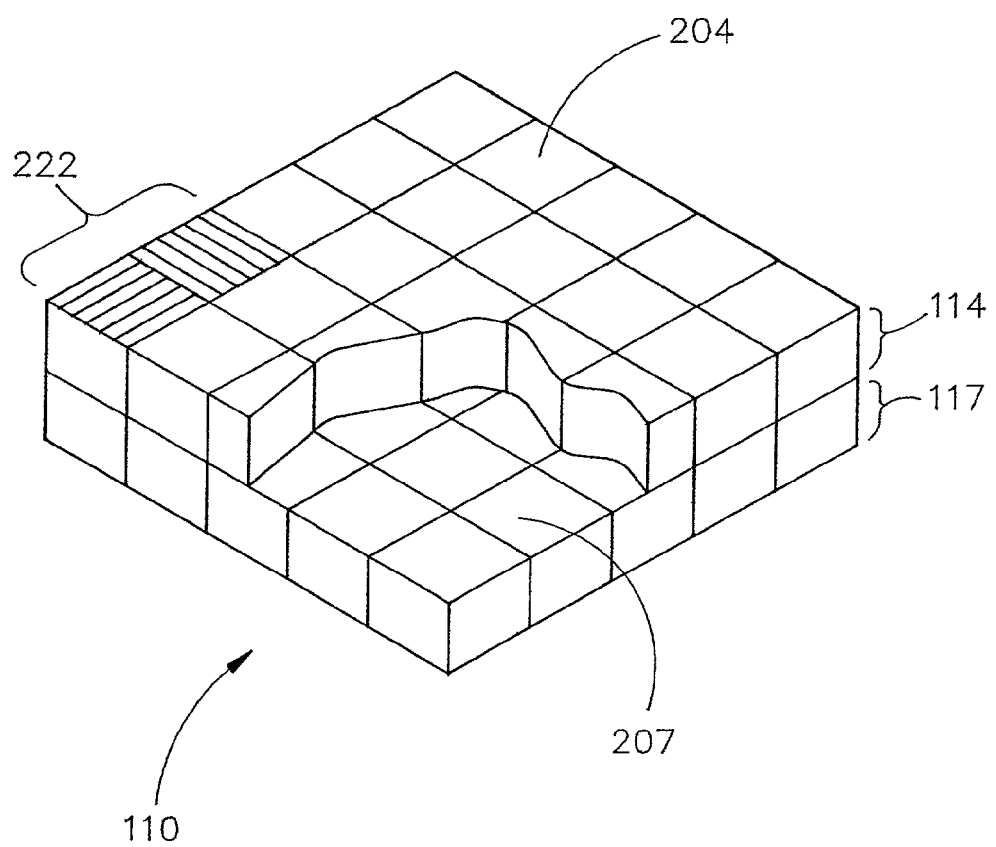
FIG. 2 shows detail of the shutter array and an electronic image sensor.

The shutter array 114 is electronically actuated and comprises a two dimensional array of individually addressable shutter elements (see FIG. 2 and accompanying discussion). The shutter array 114 is preferably a liquid crystal display (LCD) element comprising a two-dimensional array of individually addressable and actuatable shutter elements. Alternatively, the shutter array 114 may be a switchable reflecting device, such as a microelectromechanical device comprising a two-dimensional array of electrically addressable and actuatable mechanical shutter sub-elements.

The image sensor 117 may comprise an electronic image sensor or conventional film. The film may comprise a plurality of pixel elements (i.e., picture elements) to be exposed. Preferably, the image sensor 117 comprises a CCD array or a CMOS array, for example, and is formed of a two-dimensional array of pixel elements. The pixel elements receive light through the shutter array 114 and generate electronic signals related to the amount of light received.

The processor 106 may be any type of general purpose processor and may control the overall operation of the image capturing device 100. The processor 106 receives input signals from the shutter button 118 and the user interface 138 and controls a shuttering operation of the shutter array 114 in order to capture an image. In addition, if the image sensor 117 is an electronic device, the processor 106 controls the storage of digital image data produced by the image sensor 117. For example, the processor 106 may receive images and store them in the memory 120. Alternatively, the processor 106 may control camera operation in order to capture an image on film. In addition, the processor 106 receives user input signals and performs functions specified by the user input signals.

The focus rangefinder 123 may be any type of device capable of measuring a distance from the image capturing device 100 to a subject. The focus rangefinder 123 may be an ultrasound or infrared distance measuring device, for example, or alternatively may employ radio waves. The focus rangefinder 123 may provide one or more range measurements to the processor 106, and optionally may be able to obtain a plurality of range measurements over an area to be captured during an image capture process.

Alternatively, the range measurements may be generated by the processor 106 if the image sensor 117 is an electronic device such as a CCD or CMOS array, for example. This is the most commonly used method in both digital and film image capturing devices. In this embodiment, all shutter elements 204 of the shutter array 114 (see FIG. 2) may be momentarily opened such that the processor 106 receives an image comprising a two-dimensional array of pixel values (i.e., a pre-exposure). The processor 106 may use an image analysis algorithm to find edges in the resultant image and determine whether the edges are focused by determining whether the edges are sharply defined. Furthermore, by changing the focus depth of the lens apparatus 102 and performing repeated image capture and image analysis steps, the processor 106 may determine all focus depths of objects or regions in the image.

The user interface 138 may include a display device and a user input device. The display device may be any type of electronic display device, such as an LCD screen, for example. The user input device may comprise one or more buttons. The one or more buttons may be used in conjunction with a displayed menu or other selection display, and a user may manipulate the buttons in order to make selections. Alternatively, the user interface 138 may comprise a touch screen wherein the user may touch displayed icons, symbols, etc., in order to make selections and to control operation of the image capturing device 100.

In operation, the shutter array 114 is controlled by the processor 106 in response to a press of the shutter button 118. Incoming light enters the image capturing device 100 through the lens apparatus 102 and impinges upon the shutter array 114. When activated by the processor 106, the shutter array 114 allows the incoming light to pass through, i.e., the shutter array 114 transforms from a light reflective or opaque state to a light transmissive state. The shutter array 114 is controlled to be light transmissive for a predetermined exposure period, and is controlled to become light opaque or reflective at the end of the predetermined exposure period. Therefore, when the light passes through the shutter array 114 and impinges on the image sensor 117, an image may be captured by the image sensor 117.

The memory 120 may be any type of memory, including all types of random access memory (RAM), read-only memory (ROM), flash memory, magnetic storage media such as magnetic disc, tape, etc., or optical or bubble memory. In a digital image capturing device, the memory 120 may include, among other things, an image storage cell 131, an optional objects storage cell 141, an image map storage cell 162, and an optional range storage cell 167. In addition, the memory 120 may store software or firmware to be executed by the processor 106.

The image storage cell 131 may store one or more complete images. In addition, it may store image portions obtained during an image capture, such as the image portions 1 and 2 shown. The image portions may be successively captured at different focus depths in order to capture an image that is substantially in focus over its entire area. The image portions may be captured by successively focusing the lens apparatus 102 at various focus depths and exposing distinct regions of the image sensor 117, as defined by the image map 162.

The image map storage cell 162 may store one or more image maps that relate an object or focus depth to a particular grouping of shutter elements 204. Therefore, each image map stored in the image map storage cell 162 controls actuation of a predetermined grouping of shutter elements 204. By employing multiple image maps, an image capture may be conducted by successively opening each grouping of shutter elements, in conjunction with moving the lens apparatus 102 to achieve each corresponding focus depth.

The objects storage cell 141 is optional and may store definitions of one or more objects to be included in an image capture. The object definitions are generally temporary in nature and may only need to be stored until the associated image capture has been completed. The objects may be defined by focus depth measurements, by boundaries entered by the user, or may be one of several predetermined, stored shapes selected by the user.

The range storage cell 167 may store one or more focus depth range measurements. The range measurements are generally temporary in nature and may only need to be stored until the associated image capture has been completed. The range measurements are generated by the focus rangefinder 123 and may be used to capture individual image portions in order to create an image composed of a plurality of image portions.

FIG. 2 shows detail of the shutter array 114 and an electronic image sensor 117. A two-dimensional array of shutter elements 204 is formed on or assembled to a two-dimensional array of image sensor pixel elements 207. Therefore, in one embodiment a shutter element 204 may correspond substantially in size to a pixel element 207. Alternatively, in another embodiment the shutter element 204 may correspond in size to two or more pixel elements 207, allowing a shutter element 204 to shutter two or more pixel elements 207. Furthermore, the shutter array 114 is arranged so that the shutter elements 204 are substantially aligned with one or more corresponding pixel elements 207, and may operate to block or transmit light to the one or more corresponding pixel elements 207.

As previously discussed, the shutter array 114 may comprise an LCD element formed of a two-dimensional array of individually addressable and actuatable shutter elements. Therefore, the processor 106 may actuate one or more shutter elements 204, may actuate a pattern of shutter elements 204, or may actuate shutter elements 204 for differing periods of time. The shutter elements 204 may be actuated in any combination, and may be actuated according to a pattern or timetable. Therefore, the imaging module 110 according to the invention is capable of performing a pixel-by-pixel shuttering. The invention may expose small regions, even individual pixel elements, because the shutter array 114 may be formed on the electronic image sensor 117. As a result, the shutter array 114 may control exposure of the pixel elements 207 without any significant shuttering overlap, light leakage, loss of focus, etc.

In one embodiment, the LCD element is a polymer dispersed liquid crystal (PDLC) element. The PDLC element may be used without polarizing films. The PDLC element may be used regardless of the polarization effect, or alternatively a PDLC shutter array 114 may be formed of shutter elements possessing different polarization orientations in order to pass substantially non-polarized light, as discussed below.

In another embodiment, the LCD element is a nematic or super-twisted nematic LCD. In these types of LCD, both sides of the LCD element include a polarizing film. Therefore, the image capture employs polarized light. The polarizing single LCD element configuration is the simplest and cheapest, and provides the best "dark" state and may therefore still be preferable even though light is lost by having to pass through polarizing films.

The polarizing effect may be negated, however. In this embodiment, a pixel unit 222 may comprise a pair of shutter elements 204 and a pair of pixel elements 207. The paired pixel element configuration of the pixel unit 222 is desirable because of the polarization. Therefore, a pixel unit 222 according to the invention may include a shutter element of a first polarization orientation and a shutter element of a second polarization orientation. The second polarization orientation is substantially orthogonal to the first polarization orientation. As a result, the two pixel element polarizations are combined to capture substantially non-polarized light, and therefore the imaging module 110 as a unit may capture a substantially non-polarized image.

The polarizing film in this embodiment may be formed of narrow bands of polarizing material, with each pixel element of a pixel unit 222 being from a separate polarization band (the pixel elements may be separated by a small distance). The bands may be formed having substantially perpendicular polarization orientations. Alternatively, each shutter element 204 may have a corresponding polarizing element that is deposited on or otherwise formed on the LCD element.

The above non-polarizing shutter may alternatively be implemented using two LCD elements, a beam splitter, and a beam combiner. The beam splitter splits the incoming light into two light beams and each beam is separately directed into one of the two LCD shutters. In this embodiment, the two LCD shutters polarize the light, and the two LCD shutters are positioned in substantially perpendicular polarization orientations. The polarized light from each shutter is then directed into the beam combiner, wherein the two substantially perpendicular polarized light beams are combined to form a substantially non-polarized resultant light beam.

In an alternate embodiment, the shutter array 114 may comprise a two-dimensional array of individually addressable and actuatable reflective micromechanical shutter (MEMS) elements, as is known in the art. The microelectromechanical elements may be actuated by an electric current. Unlike the prior art, however, the microelectromechanical elements are used as a reflective shutter. The MEMS device comprises actuatable mirrors that can reflect light straight out from the array or scatter it. As before, the actuation of the micromechanical elements is controlled by the processor 106 and may be controlled and actuated to selectively expose regions of the electronic image sensor 117.

Figure 3:
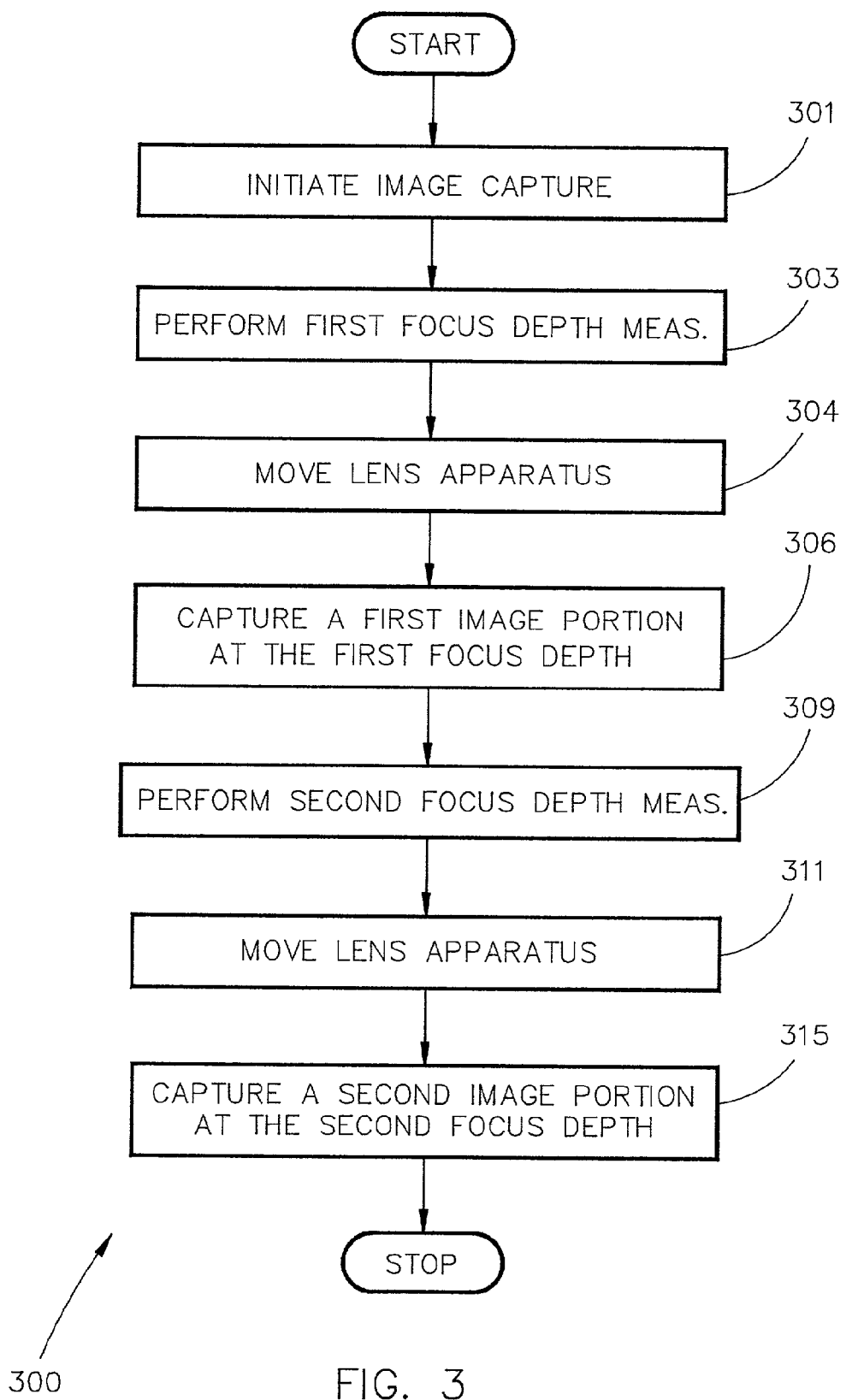
FIG. 3 is a flowchart of an image capturing method according to one embodiment of the invention.

FIG. 3 is a flowchart 300 of an image capturing method according to one embodiment of the invention. In step 301, an image capture is initiated. This is generally done at a press of the shutter button 118.

In step 303, the image capturing device 100 performs a first focus depth measurement. This may be done using the focus rangefinder 123 or using the image analysis, for example. The first focus depth measurement may be a distance to a subject of the image capture, such as a measurement of a distance to an object centered in a viewfinder of the image capturing device 100. The image capturing device 100 therefore generates a two-dimensional array of focus depth measurements (i.e., an image map).

In step 304, the lens apparatus 102 is moved to focus at the first focus depth.

In step 306, a first image portion is captured at the first focus depth, corresponding to a first subset of the plurality of picture elements. The first image portion may be, for example, an object or item within cross hairs or designated region of the camera's field of view, for example. The first image portion is captured by opening and closing only those shutter elements 204 corresponding to the designated region at a first focus depth. The image capture therefore comprises exposing a portion of film or a portion of the electronic image sensor 117. For example, the first image portion may expose all pixel outputs corresponding to a focus depth of four to six feet.

In an optional step 309, the image capturing device 100 performs a second focus depth measurement. This may be done by the user moving a cross-hairs or pointer to another region and initiating a second focus measurement. A user may therefore designate multiple focus regions. Alternatively, the second focus depth may be a default, such as an infinite or maximum focus depth (i.e., the first focus depth is the distance to a subject and the second focus depth captures a background).

In step 311, the lens apparatus 102 is moved to focus at the second focus depth.

In step 315, a second image portion is captured at the second focus depth, corresponding to a second subset of the plurality of picture elements. The second image portion is captured by opening and closing only those shutter elements 204 corresponding to the designated region at a second focus depth.

It should be understood that more than two image portions may be captured. Only two are shown and discussed in order to illustrate the concept of the invention, i.e., that by using a shutter array 114 comprising a plurality of shutter elements 204, the image capturing device 100 may capture portions of an image at different focal depths. Therefore, the image capturing device 100 according to the invention may perform iterative steps of measuring focal depths, moving the lens apparatus 102, and capturing successive image portions in order to capture a complete image that is substantially focused over an entire image area.

The above described method also may be employed in a camera using conventional film. Alternatively, the method may be employed in an image capturing device 100 that employs a CMOS image sensor 117. The CMOS image sensor 117 is capable of capturing partial images. Alternatively, a CCD image sensor 117 may be used, but cannot capture and output a partial image. However, the image capturing device 100 does not have to accept or store all image output from the image sensor 117. Therefore, in a CCD image sensor embodiment, either partial images may be saved to memory or multiple images may be captured and combined in memory in order to form a resultant image that was captured at multiple focus depths.

Figure 4:
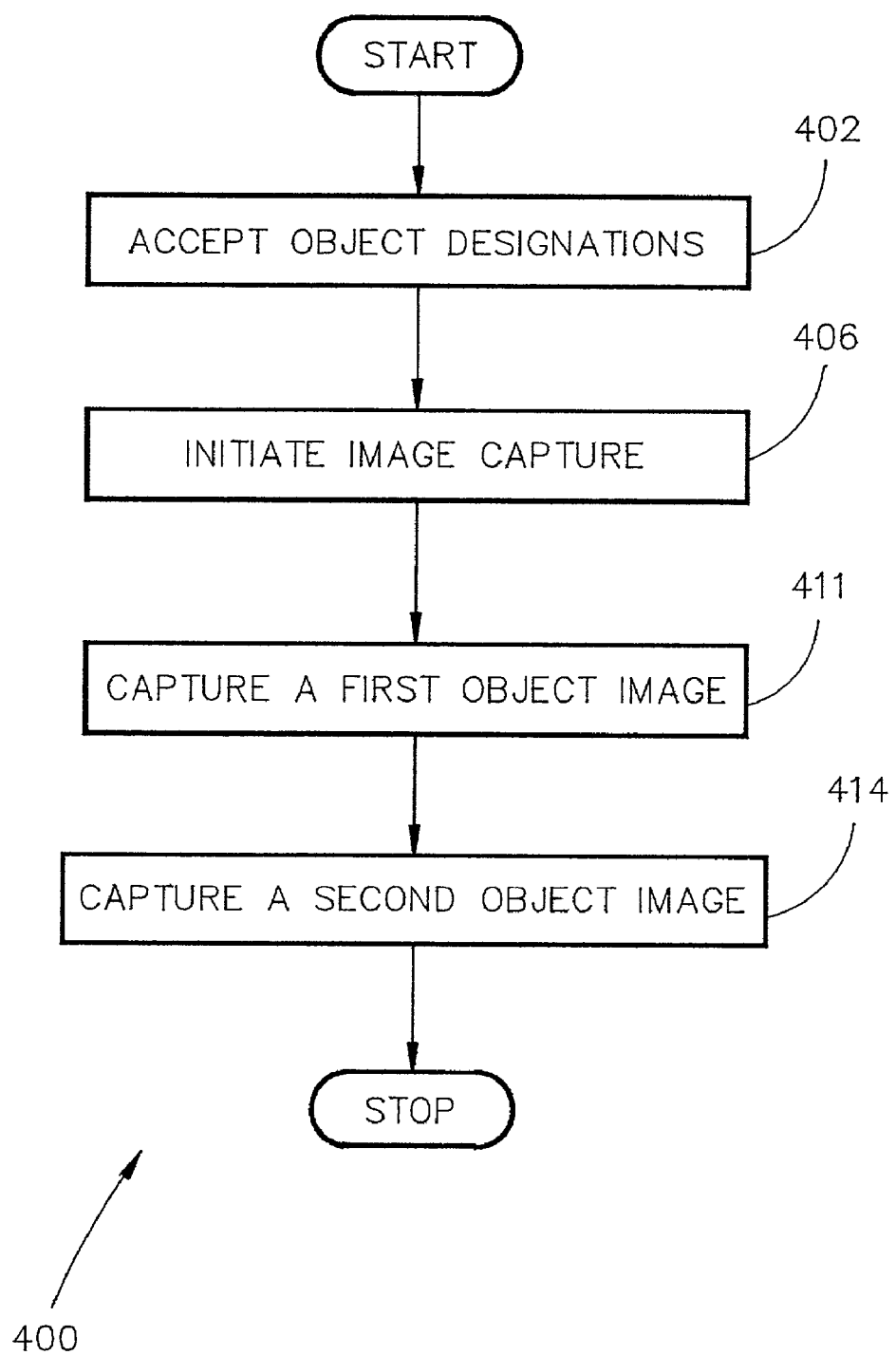
FIG. 4 is a flowchart of an image capturing method according to another embodiment of the invention.

FIG. 4 is a flowchart 400 of an image capturing method according to another embodiment of the invention. In step 402, object designations are accepted by the image capturing device 100. The object designations may be input by a user. If input by the user, the designations may be generated by employing object selection indicia. The object selection indicia may be a cross-hairs or pointer that may be moved in a display, such as a display of the user interface 138. Therefore, the user may be able to designate an object by pressing a select button or mode button when the cross-hairs or pointer is positioned on the object in the display. Alternatively, the user may select objects or regions of interest. For example, the user may be able to create a box or shape surrounding an object. Alternatively, an object or objects may be automatically generated by the processor 106 using image analysis (i.e., by detecting edges, for example).

Alternatively, if the image capturing device 100 automatically generates object designations, this may be done by measuring focus depths and grouping areas of substantially similar focus depths as being objects.

In step 406, the image capture is initiated, as previously discussed.

In step 411, a first object is captured by exposing a first subset of the pixel elements. The first object may be at a first focus depth.

In step 414, a second object image may be captured by exposing a second subset of the pixel elements. The second object may optionally be at a second focus depth, although it may be at approximately at the same focus depth as other objects in the image capture. The second object image is distinct from the first object and may appear in a different part of the image.

It should be understood that the method 400 may be iteratively performed and may be done for more than two objects. Therefore, according to the method, the image capturing device 100 or the user may designate multiple objects, the lens apparatus 102 may be moved accordingly, and corresponding groupings of shutter elements 204 may be opened and closed to capture an image composed of multiple objects and therefore of multiple image portions.

The image capturing device and methods discussed above have several advantages. The image capturing process may be more finely controlled and the image capture may be conducted at multiple focus depths in order to achieve an image that is substantially focused throughout. Moreover, the user has more control of the focus of the image capturing device, and can capture images wherein objects are at different focus depths.

We claim:

1. A still image capturing device, comprising:
   a focusable lens apparatus capable of being focused over a range of focus depths;
   an image sensor comprising a plurality of pixel elements;
   an electronically actuatable shutter device comprising a plurality of individually addressable and actuatable shutter elements, with a shutter element of said plurality of individually addressable shutter elements substantially corresponding to one or more pixel elements of said plurality of pixel elements; and
   a processor communicating with said lens apparatus, said image sensor, and said shutter device, said processor controlling a focus depth of said lens apparatus and selectively actuating particular shutter elements of said shutter device associated with each of a plurality of focus depths during image capture.

2. The apparatus of claim 1, further comprising: a memory including one or more image storage cells capable of storing one or more images or one or more image portions, one or more objects storage cells capable of storing definitions of one or more objects to be included in an image capture, one or more image map storage cells capable of storing one or more image maps that relate an object or focus depth to a particular grouping of shutter elements, and one or more range storage cells capable of storing one or more focus depth range measurements;
   wherein said processor is capable of controlling said plurality of shutter elements according to an image map or one or more objects stored in said memory.

3. The apparatus of claim 1, further comprising a focus rangefinder capable of measuring one or more focus depths in an image to be captured.

4. The apparatus of claim 1, further comprising at least one user input device, wherein said at least one user input device is capable of being manipulated by a user in order to set focus regions in an image to be captured.

5. The apparatus of claim 1, wherein said image sensor comprises a two-dimensional array of pixel elements and said shutter device comprises a two-dimensional array of shutter elements.

6. The apparatus of claim 1, wherein said image sensor is a photographic film.

7. An image capturing method for a still image capturing device, wherein the still image capturing device comprises a shutter device comprising a set of individually addressable and actuatable shutter elements, comprising the steps of:
   initiating an image capture in an image sensor of said image capturing device, with said image sensor comprising a plurality of pixel elements;
   obtaining a first focus depth;
   moving a lens apparatus of said image capturing device to said first focus depth;
   capturing a first image portion corresponding to a first subset of said plurality of pixel elements at said first focus depth, wherein said first subset of pixel elements is associated with a first subset of said shutter elements and said capturing step comprises actuating only said first subset of said shutter elements;
   obtaining a second focus depth;
   moving said lens apparatus to said second focus depth; and
   capturing a second image portion corresponding to a second subset of said plurality of pixel elements at said second focus depth, wherein said second subset of pixel elements is associated with a second subset of said shutter elements and said capturing step comprises actuating only said second subset of said shutter elements, wherein said first subset of shutter elements is different than said second subset of shutter elements.

8. The method of claim 7, wherein the obtaining steps further comprise receiving said first and second focus depths from a focus rangefinder sensor.

9. The method of claim 7, wherein the obtaining steps generate a two-dimensional array of focus depth measurements.

10. The method of claim 7, wherein the method further comprises:
    opening all shutter elements of said shutter device to perform a pre-exposure of said sensor element to capture a pre-image; and
    performing an image analysis on said pre-image to mathematically determine a focus depth of one or more regions in said pre-image.

11. The method of claim 7, wherein the capturing steps capture a partial image.

12. The method of claim 7, wherein the capturing steps capture complete images, and wherein portions of said complete images are combined to form a resultant image.

13. An image capturing method for a still image capturing device having an image sensor comprising a plurality of pixel elements, comprising the steps of:
    accepting a first object designation corresponding to a first object of an image to be captured;
    accepting a second object designation corresponding to a second object of the image to be captured;
    in response to a single press of a shutter button;
    (a) capturing a first image by exposing a first subset of said pixel elements, wherein the first image includes an image of the first object; and
    (b) after capturing the first image, capturing a second image by exposing a second subset of said pixel elements, wherein the second image includes an image of the second object and wherein said first subset of pixel elements is different than said second subset of pixel elements.

14. The method of claim 13, wherein the first accepting step comprises designating a grouping of shutter elements substantially corresponding to the first object.

15. The method of claim 13, wherein said object designations are entered by a user.

16. The method of claim 15, further comprising the steps of:
    enabling said user to position an object indicia on the first object; and
    enabling said user to select said object by manipulating a select input device.

17. The method of claim 13, wherein said object designations are automatically generated by a processor of said image capturing device, said processor employing an image analysis procedure.

18. The method of claim 13, wherein said first object is at a first focus depth and said second object is at a second focus depth.

19. The method of claim 13, wherein said first object is at a first focus depth and said second object is approximately at said first focus depth.

20. The method of claim 13, wherein a lens apparatus of said image capturing device is moved before capture of said second image and after capture of said first image.

21. An image capturing method for a still image capturing device, comprising the steps of:
    accepting object designations of one or more objects in an image to be captured;
    initiating an image capture in an image sensor of said image capturing device, with said image sensor comprising a plurality of pixel elements;
    capturing a first object image by exposing a first subset of said pixel elements; and
    capturing a second object image by exposing a second subset of said pixel elements,
    wherein the accepting step comprises designating a grouping of shutter elements substantially corresponding to an object.

22. The method of claim 21, wherein said object designations are entered by a user.

23. The method of claim 22, further comprising the steps of:
    enabling said user to position an object indicia on the first object; and
    enabling said user to select said object by manipulating a select input device.

24. The method of claim 21, wherein said object designations are automatically generated by a processor of said image capturing device, said processor employing an image analysis procedure.

25. The method of claim 21, wherein said first object is at a first focus depth and said second object is at a second focus depth.

26. The method of claim 21, wherein the initiating step is performed at a press of a shutter button of said image capturing device.

27. The method of claim 21, wherein a lens apparatus of said image capturing device is moved before capture of said second image and after capture of said first image.

* * * * *

UNITED STATES PATENT AND TRADEMARK OFFICE
CERTIFICATE OF CORRECTION

PATENT NO. : 6,956,612 B2  
APPLICATION NO. : 09/919521  
DATED : October 18, 2005  
INVENTOR(S) : Heather Noel Bean et al.

Page 1 of 1

It is certified that error appears in the above-identified patent and that said Letters Patent is hereby corrected as shown below:

IN THE CLAIMS

Claim 2, Column 7, line 44, delete "apparatus" and insert therefor --device--

Claim 3, Column 7, line 57, delete "apparatus" and insert therefor --device--

Claim 4, Column 7, line 60, delete "apparatus" and insert therefor --device--

Claim 5, Column 7, line 64, delete "apparatus" and insert therefor --device--

Claim 6, Column 8, line 1, delete "apparatus" and insert therefor --device--

Signed and Sealed this

Twenty-sixth Day of June, 2007

JON W. DUDAS  
*Director of the United States Patent and Trademark Office*